United States Patent [19]
Maeda et al.

[11] Patent Number: 5,299,955
[45] Date of Patent: Apr. 5, 1994

[54] BATTERY TERMINAL MOUNTING MEANS FOR A PORTABLE ELECTRICAL DEVICE

[75] Inventors: Hajime Maeda; Toru Tachikawa, both of Itami; Hitoshi Yoshikawa, Sanda, all of Japan

[73] Assignee: Mitsubishi Denki Kabushiki Kaisha, Tokyo, Japan

[21] Appl. No.: 872,031

[22] Filed: Apr. 23, 1992

[30] Foreign Application Priority Data

Apr. 23, 1991 [JP] Japan .................................. 3-092137

[51] Int. Cl.⁵ ............................................ H01R 13/00
[52] U.S. Cl. .................................... 439/500; 361/532
[58] Field of Search ................. 439/500; 361/399, 417, 361/419, 420

[56] References Cited

U.S. PATENT DOCUMENTS

| | | | |
|---|---|---|---|
| 3,510,823 | 5/1970 | Cervenka et al. | 339/17 |
| 3,629,793 | 12/1971 | Ettischer et al. | 439/500 |
| 4,107,400 | 8/1978 | Grohoski | 439/500 |
| 4,718,742 | 1/1988 | Utoh et al. | 439/627 |

*Primary Examiner*—Joseph H. McGlynn
*Attorney, Agent, or Firm*—Leydig, Voit & Mayer

[57] ABSTRACT

In a portable electrical device, a plurality of engaging portions of a frame on surfaces of the frame are directed in the same direction and engaging portions on two connecting terminals can be brought into engagement with the engaging portions along the same direction. Thus, both of the connecting terminals can be mounted on the frame from the same direction, and the efficiency of the mounting operation is improved and can be automated. Furthermore, deformation of or damage to the connecting terminals, caused by the mounting process, is reduced.

7 Claims, 5 Drawing Sheets

BATTERY TERMINAL MOUNTING MEANS FOR A PORTABLE ELECTRICAL DEVICE

BACKGROUND OF THE INVENTION

1. Field of the Invention

The present invention relates to a portable electrical device and, more specifically, to a structure for mounting connecting terminals for the electrodes of an electric cell in a portable electrical device. More particularly, the present invention pertains to a structure for mounting connecting terminals for the electrodes of an electric cell on a frame of an IC card.

2. Description of the Related Art

FIGS. 4 and 5 are respectively plan and cross-sectional views illustrating how connecting terminals for the electrodes of an electric cell are mounted on a frame of a conventional IC card. FIGS. 6A and 6B are respectively plan and side elevational views of a conventional connecting terminal for the plus electrode of the cell. FIGS. 7A and 7B are respectively plan and side elevational views of a conventional connecting terminal for the minus electrode of the cell. In these figures, a frame 1 supports a circuit board on which electronic parts are mounted and connecting terminals of the electrodes of an electric cell. The frame 1 has pins 2a and 2b as engaging portions. The frame 1 also has insertion holes 3a and 3b in side surfaces of the frame. A connecting terminal 4 for the plus electrode, made of an elastic member, such as a thin stainless steel plate, has pin holes 4a as engaged portions into which the pins 2a are inserted, a tab 4b as an engaging portion that is brought into engagement with the insertion hole 3a, and a contact portion 4c that makes contact with the plus electrode surface of the electric cell.

A connecting terminal 5 for the minus electrode, made of an elastic member, such as a thin stainless steel plate, has pin holes 5a that are engaging portions into which the pins 2b are inserted, tabs 5b as engaging portions that are brought into engagement with the insertion holes 3b, and a contact portion 5c that makes contact with the minus electrode surface of the electric cell.

To mount the connecting terminals 4 and 5 on the frame 1, the tab 4b of the connecting terminal 4 is inserted into the insertion hole 3a from the direction of the side surface of the frame 1, and then the pin holes 4a are fitted with the pins 2a from the direction of the upper surface of the frame 1.

Next, the two tabs 5b of the connecting terminal 5 are inserted into the corresponding insertion holes 3b from direction A of the side surface of the frame 1, and then the pin holes 5a are fitted with the pins 2b from direction B of the upper surface of the frame 1.

Thereafter, heat is applied to the pins 2a and 2b to deform them and thereby fix the connecting terminals 4 and 5 for the plus and minus electrodes to the frame 1.

In the conventional connecting terminal mounting structure for electric cell electrodes, the tabs 4b and 5b are inserted into the insertion holes 3a and 3b in the frame 1 from the right and left side surfaces of the frame 1, and the pin holes 4a and 5a are fitted with the pins 2a and 2b located on the frame 1 perpendicular to the right and left side surfaces. Since the connecting terminals are thus mounted on the frame in various directions, the mounting work is inefficient and cannot be automated. Furthermore, the mounting work may deform and damage the connecting terminals 4 and 5.

SUMMARY OF THE INVENTION

Accordingly, an object of the present invention is to provide a portable device in which connecting terminals for electrodes are mounted on a frame in only one direction to improve the mounting work efficiency.

In order to achieve the above object, there is provided a portable electrical device comprising a circuit board on which electronic parts are mounted, a pair of connecting terminals for electrical connection to a plus electrode and a minus electrode of an electric cell, and a frame on which the circuit board and the pair of connecting terminals are mounted. The frame has a plurality of engaging portions on surfaces that are directed in the same direction, the engaging portions engaging the connecting terminals. The connecting terminals have engaged portions that are brought into engagement with the engaging portions of the frame from the same direction. The pair of connecting terminals are mounted on the frame from the same direction along parallel straight lines such that the engaging portions of the frame and the engaging portions of the connecting terminals are matingly engaged with each other.

In the present invention, since the engaging portions on the connecting terminals are brought into mated engagement with the plurality of engaging portions on the surfaces of the frame from only one direction, the directions along which the connecting terminals are mounted on the frame are the same.

DESCRIPTION OF THE PREFERRED EMBODIMENTS

Figure 1:
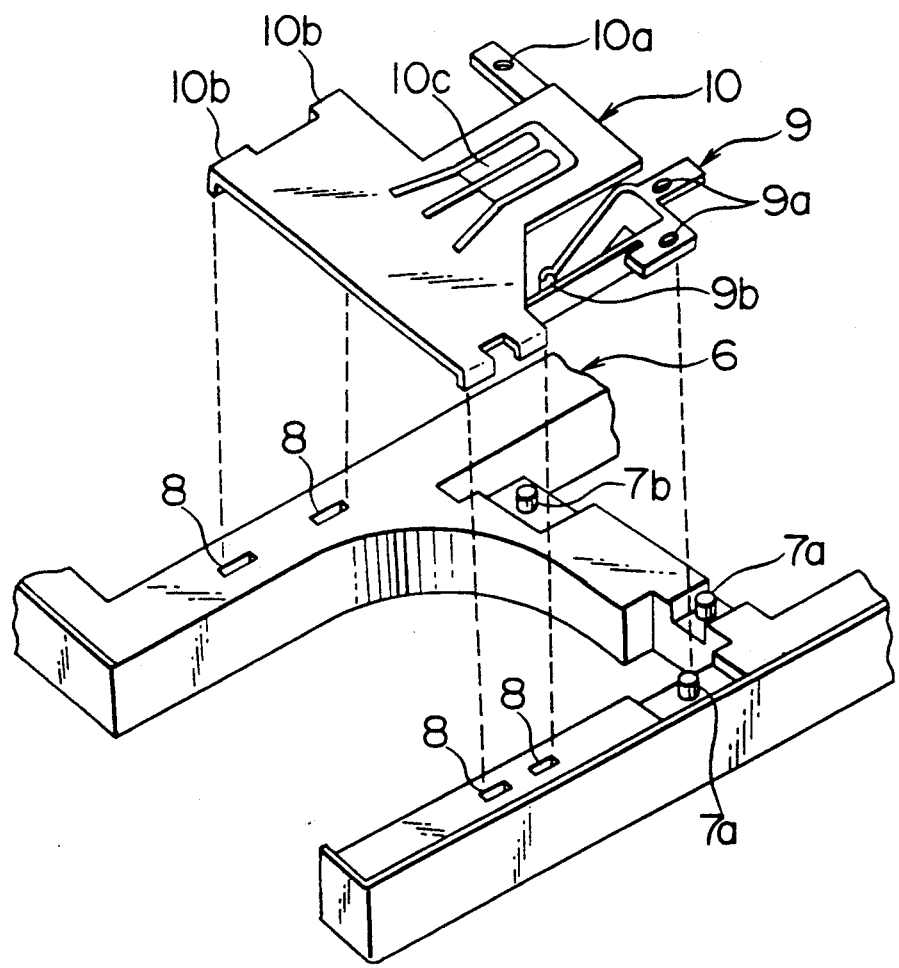
FIG. 1 is an exploded perspective view illustrating a connecting terminal mounting structure for electric cell electrodes in accordance with a first embodiment of the present invention.
Figure 2:
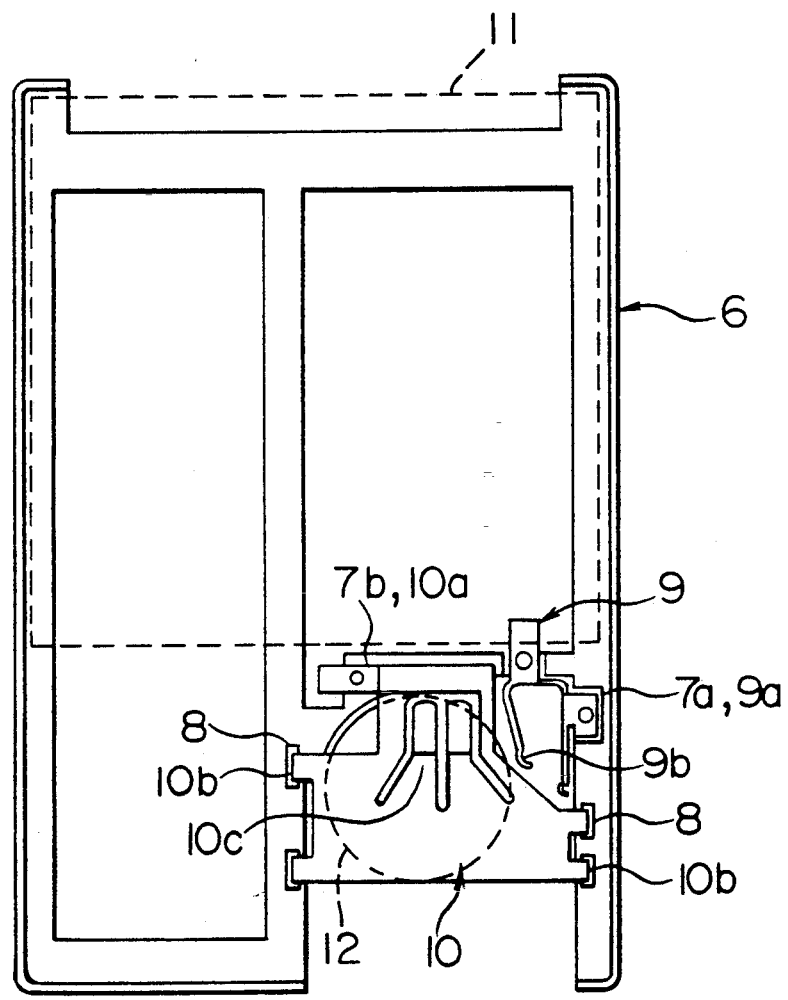
FIG. 2 is a plan view illustrating the mounting structure of FIG. 1.

FIG. 1 is an exploded perspective view illustrating an electrode connecting terminal mounting structure in a portable device, such as an IC card, according to the present invention. FIG. 2 is a plan view illustrating how an electrode connecting terminal is mounted on a portable device, such as an IC card, according to the present invention. In these figures, a frame 6 supports a circuit board 11 on which electronic parts are mounted. The frame 6 has pins 7a and 7b as engaging portions. The frame 6 also has insertion holes serving as engaging portions. The pins 7a and 7b and the insertion holes are located on and in the surface of the frame 6 that is directed upward in FIGS. 1 and 2.

A plus electrode connecting terminal 9 made of an elastic member, such as a stainless thin plate, has pin holes 9a as engaging portions that are brought into mated engagement with the pins 7a on the frame 6. A contact portion makes contact with a plus terminal surface of an electric cell 12 due to an elasticity of the connecting terminal 9. The two pin holes 9a are located in small parts of the connecting terminal 9 that are parallel to each other.

A minus electrode connecting terminal 10, made of an elastic member, such as a stainless thin plate, has a pin hole 10a as an engaging portion that is brought into mated engagement with the pin 7b on the frame 6. The connecting terminal 10 also has tabs 10b as engaged portions that are brought into engagement with the insertion holes 8 in the frame 6. A contact portion 10c makes contact with a minus electrode surface of the electric cell 12 due to the elasticity of the connecting terminal 10. The part of the connecting terminal 10 in which the pin hole 10a is located and the tabs 10b are substantially perpendicular to each other.

To mount the electrode connecting terminals on the frame, first, the connecting terminal 9 is mounted on the frame 6 from above, in the figures, with the pins 7a fitted into the pin holes 9a. Next, the connecting terminal 10 is mounted on the frame 6 from above, in the figures, with the hole 10a engaged with the pin 7b and the tabs 10b engaged with the insertion holes 9. Thereafter, heat is applied to the pins 7a and 7b to fix the parts of the connecting terminals 9 and 10 to the frame 6. Thus, the plus electrode connecting terminal 9 is fixed to the frame 6 by heating and deforming the two pins 7a. The minus electrode connecting terminal 10 is fixed to the frame 6 by heating and deforming the pin 7b as well as by inserting tabs 10b into the insertion holes 8.

The voltage of a thin plate type electric cell 12 is supplied to the IC card through the contact portions 9b and 10c due to the elasticity of the plus and minus electrode connecting terminals 9 and 10.

In this embodiment, the frame 6 is fixed to the electrode connecting terminals 9 and 10 by heating and deforming the pins 7a and 7b as well as by inserting the tabs 10b into the insertion holes 9. However, any structure may be employed as long as the engaging portions on the frame can be brought into engagement with the engaging portions on the connecting terminals in the same direction. In that case, the frame may be fixed to the connecting terminals by either heat or by insertion of the tabs into the insertion holes.

Figure 3:
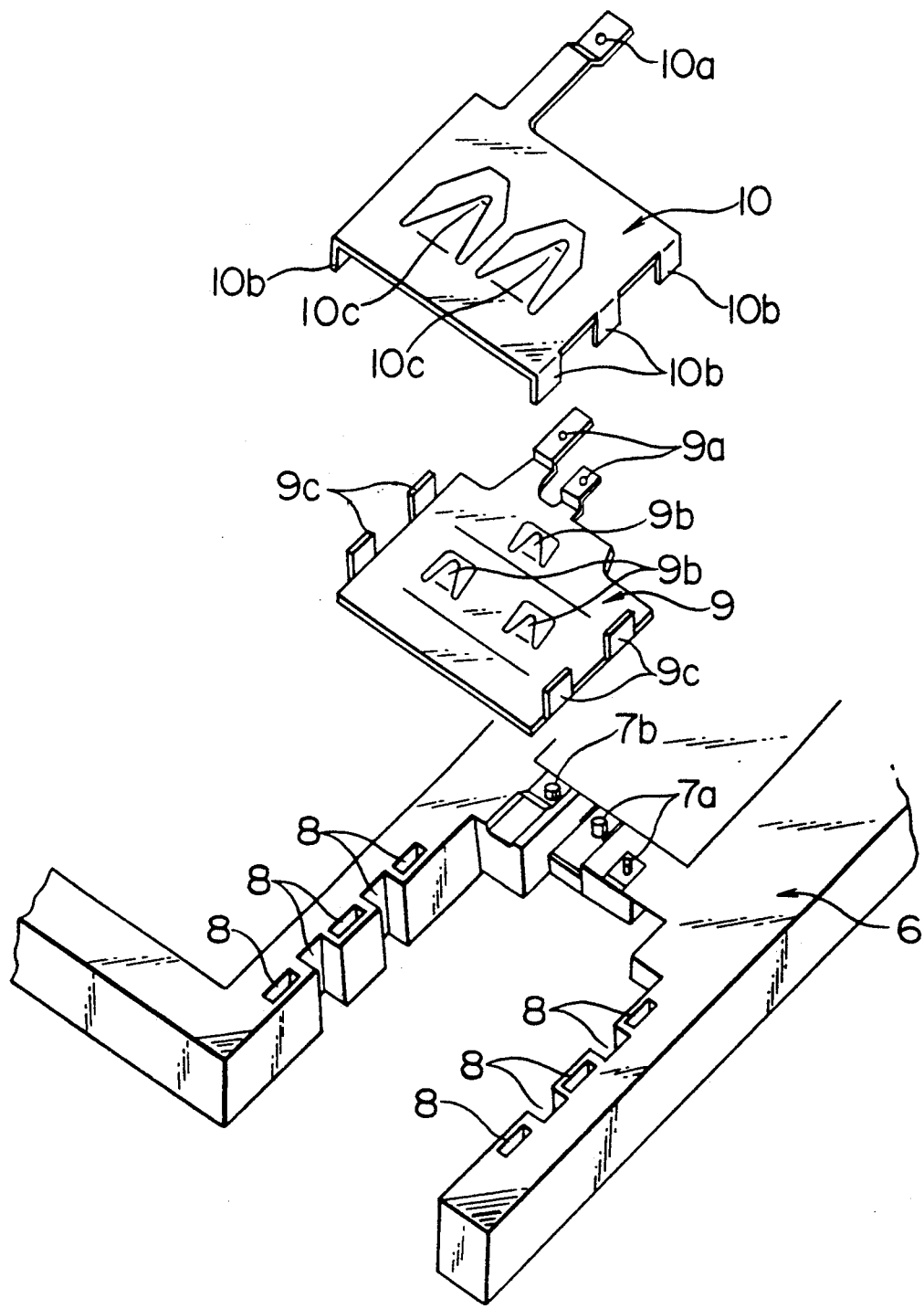
FIG. 3 is an exploded perspective view of a connecting terminal mounting structure for electric cell electrodes in accordance with a second embodiment of the present invention.
Figure 4:
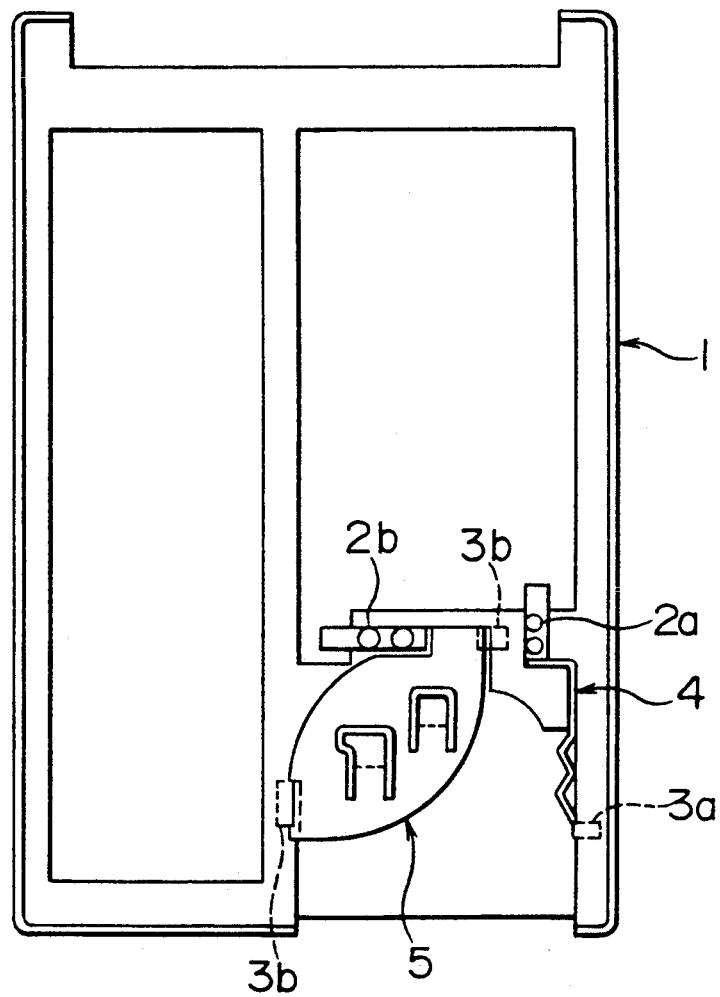
FIG. 4 is a plan view illustrating a connecting terminal mounting structure for electric cell electrodes in a conventional portable electrical device.
Figure 5:
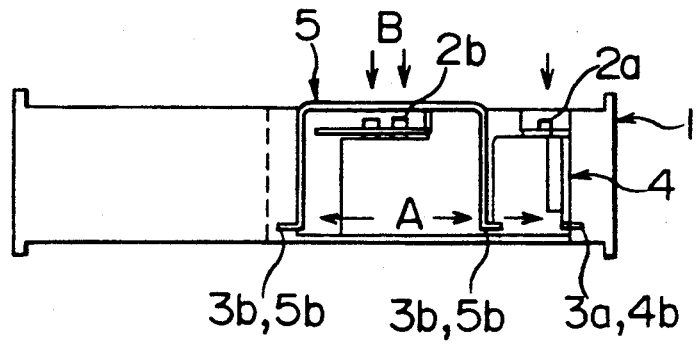
FIG. 5 is a side cross-sectional view illustrating a connecting terminal mounting for electric cell electrodes in a conventional portable electrical device.
Figure 6A:
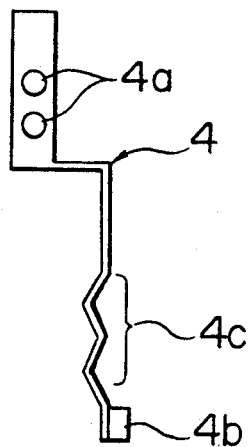
FIGS. 6A and 6B are a plan view and a side view of connecting terminal 4 of FIG. 4.
Figure 6B:
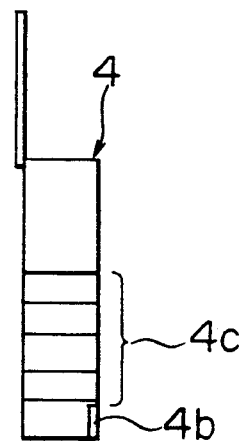
Figure 7A:
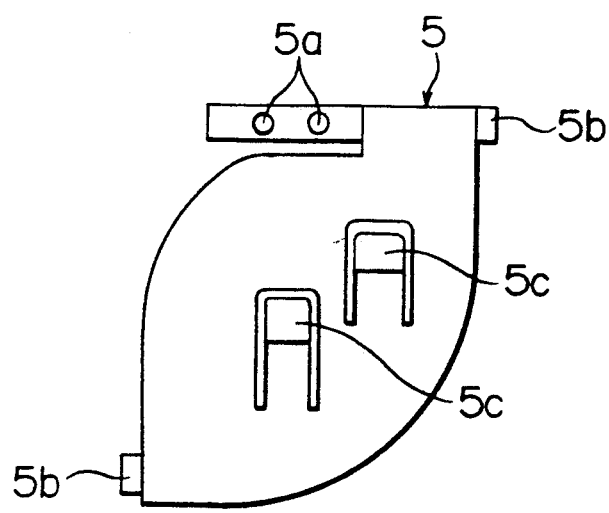
FIGS. 7A and 7B are a plan view and a side view of connecting terminal 5 of FIG. 4.
Figure 7B:
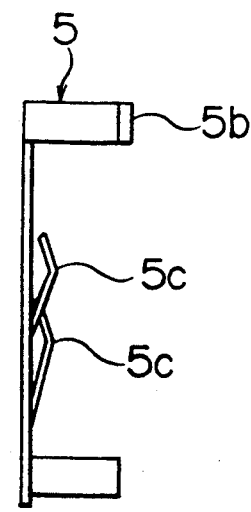

In this embodiment, the engaging portions include pins and insertion holes that engage engaging portions including pin holes and tabs. However, the present invention is not limited to this configuration. Any configuration in which the engaging portions on the frame can be brought into engagement with the engaging portions on the connecting terminals in the same direction can be adopted. A structure such as that shown in FIG. 3 may also be employed. In this structure, an electric cell is sandwiched between the connecting terminals 9 and 10.

Although the cell electrode connecting terminal mounting structure has been described for an IC card, the present invention can also be applied to other portable electrical devices, such as calculators or portable electronic game machines.

As will be understood from the foregoing description, in the present invention, a plurality of engaging portions of the frame on the surfaces of the frame are directed in the same direction, while engaging portions on the connecting terminals are brought into engagement with the engaging portions on the frame in the same direction. Thus, both of the connecting terminals are mounted on the frame from the same direction, and the efficiency of the mounting operation is improved. Also, the mounting operation can be automated. Furthermore, deformation of or damage to the connecting terminals, caused by the mounting process, is reduced.

What is claimed is:

1. A battery terminal mounting arrangement for a portable electrical device comprising:
   a circuit board on which electronic parts are mounted;
   first and second connecting terminals for electrical connection to a plus electrode and a minus electrode of an electric cell, respectively; and
   a frame on which said circuit board and said first and second connecting terminals are mounted, wherein said frame has a plurality of engaging portions all of which are directed in the same direction, said first and second connecting terminals having engaging portions which engage said engaging portions of said frame, said first and second connecting terminals being mounted on said frame from the same direction.

2. The arrangement of claim 1 wherein said connecting terminals are mounted on said frame perpendicular to said frame.

3. The arrangement of claim 1 wherein said engaging portions of said frame are pins, and said engaging portions of said connecting terminals are holes.

4. The arrangement of claim 1 wherein said engaging portions of said frame are holes in said frame, and said engaging portions of said connecting terminals are tabs for insertion into said holes.

5. The arrangement of claim 1 including an electrical cell sandwiched between said first and second connecting terminals.

6. A battery terminal mounting arrangement for a portable electrical device comprising:
   a frame including a surface having a plurality of engaging portions;
   a first connecting terminal for contacting a first terminal of a battery and having a plurality of engaging portions each in mated engagement with one of the engaging portions of the frame; and
   a second connecting terminal for contacting a second terminal of the battery and having a plurality of engaging portions each in mated engagement with one of the engaging portions of the frame wherein all of the engaging portions of the first connecting terminal are brought into mated engagement with engaging portions of the frame by movement of the first connecting terminal relative to the frame along a first single straight line and all of the engaging portions of the second connecting terminal are brought into mated engagement with engaging portions of the frame by movement of the second connecting terminal relative to the frame along a second single straight line parallel to the first straight line.

7. The arrangement of claim 6 wherein the first connecting terminal has a periphery, the engaging portions of the frame include a plurality of holes in the surface of the frame, and the engaging portions of the first connecting terminal include a plurality of tabs extending perpendicularly from the periphery of the first connecting terminal into the holes.

* * * * *